United States Patent [19]
Franke

[11] Patent Number: 5,525,746
[45] Date of Patent: Jun. 11, 1996

[54] METHOD FOR SELECTIVE EXTRACTION OF COMPOUNDS FROM CARBONACEOUS MATERIALS

[75] Inventor: Henry L. Franke, Baton Rouge, La.

[73] Assignee: Univesity Research & Marketing Inc., Baton Rouge, La.

[21] Appl. No.: 256,258
[22] PCT Filed: Dec. 31, 1992
[86] PCT No.: PCT/US92/11394
   § 371 Date: Jun. 30, 1994
   § 102(e) Date: Jun. 30, 1994
[87] PCT Pub. No.: WO93/13035
   PCT Pub. Date: Jul. 8, 1993
[51] Int. Cl.$^6$ .................................................. C07C 1/00
[52] U.S. Cl. .................. 554/12; 554/20; 426/417; 426/425; 426/574; 426/580; 426/593; 426/601; 426/608; 426/615
[58] Field of Search .................. 554/12, 20; 456/417, 456/425, 574, 580, 593, 607, 608, 615

[56] References Cited

U.S. PATENT DOCUMENTS

| | | | |
|---|---|---|---|
| 4,756,916 | 7/1988 | Dreher et al. | 426/302 |
| 4,873,093 | 10/1989 | Fazzolare | 426/28 |
| 4,906,483 | 3/1990 | Kloos | 426/243 |
| 4,919,965 | 4/1990 | Childers | 426/615 |
| 5,202,139 | 4/1993 | Gaoh et al. | 426/242 |
| 5,298,707 | 3/1994 | Sprecher et al. | 219/693 |
| 5,312,635 | 5/1994 | Kazlas et al. | 426/417 |
| 5,370,898 | 12/1994 | Zussman | 426/615 |

*Primary Examiner*—José G. Dees
*Assistant Examiner*—Deborah D. Carr

[57] ABSTRACT

An improved low temperature process for extracting oil from oil-bearing materials by extracting the oil-bearing material in an extraction zone with a normally gaseous solvent selected from propane, butane, and mixtures thereof. As the resulting solvent/oil mixture is passed through the bed of extracted oil-bearing material, from the extraction zone, and to a separation zone, it is done so under conditions that will maintain the solvent in liquid form. The resulting extracted materials have substantially more of their protein and vitamin value intact when compared with similar materials extracted by more conventional high temperature methods. The present process is also a lower energy consuming process than more conventional, extractive processes.

20 Claims, 7 Drawing Sheets

Figure 7

TOCOPHEROL AND TOCOTRIENOL CONTENT OF "CSP" AND JAPANESE RICE BRAN OIL

| SAMPLE I.D. | PPM TOCOTRIENOLS | | | | PPM TOCOPHEROLS | | | | PPM TOTALS |
|---|---|---|---|---|---|---|---|---|---|
| | DELTA | BETA/GAMMA | ALFA | PPM TOTAL | DELTA | BETA/GAMMA | ALFA | PPM TOTAL | TOCOLS |
| "CSP" CRUDE RICE BRAN OIL | 116 | 2204 | 276 | 2596 | 24 | 380 | 320 | 724 | 3320 |
| JAPANESE CRUDE RICE BRAN OIL | 72 | 610 | ND | 683 | 81 | 278 | ND | 359 | 1041 |

GAMMA-ORYZANOL CONTENT OF "CSP" AND JAPANESE RICE BRAN OIL

| SAMPLE I.D. | CYCLOARTENYL FERULATE | 24 METHANE FERULATE | CAMPESTERYL FERULATE | SITOSTERYL FERULATE | STIGMASTERYL FERULATE | PPM TOTAL |
|---|---|---|---|---|---|---|
| "CSP" CRUDE RICE BRAN OIL | 4600 | 5112 | 2864 | 1924 | 256 | 14756 |
| JAPANESE CRUDE RICE BRAN OIL | 2592 | 2969 | 1742 | 1054 | 109 | 8466 |

METHOD FOR SELECTIVE EXTRACTION OF COMPOUNDS FROM CARBONACEOUS MATERIALS

This is a 371 application of PCT/US92/11394 filed Dec. 31, 1992.

FIELD OF THE INVENTION

The present invention relates to methods for selective extraction of desired compounds from carbonaceous materials, and more particularly to a solvent extraction process for the removal of selected compounds from carbonaceous materials.

BACKGROUND OF THE INVENTION

In many instances the characteristics of a particular carbonaceous material can be altered by the removal of certain compounds from the material. Examples of some compounds which it may be desirable to remove would include: phospholipids, fats, fatty acids, alcohols, waxes, gums, stearols, oil soluble proteins, flavonol, mineral oils, essential oils, and PCB's.

More particularly, oils derived from plant materials, such as oil-seeds, cereal brans, fruits, beans, and nuts, are the source of raw material for many important commercial products. For example, such oils from such plant materials are extensively used in cooking, low fat and fat free cooked food, in cosmetics, pharmaceuticals as carriers for insecticides and fungicides, in lubricants, and in myriad other useful products. Consequently, much work has been done over the years in developing improved processes for extracting oil from such materials.

One of the most widely used processes for removing oil from oil-bearing materials is solvent extraction. In solvent extraction, the oil-bearing material is treated with a suitable solvent, usually the lower carbon alkanes such as hexane, at elevated temperatures and low pressures, to extract the oil from the oil-bearing material. The resulting solvent/oil mixture is then fractionated to separate the valuable oil from the solvent, which is recycled. Most solvent extraction processes in commercial use today employ hexane as the solvent. While hexane extraction is the most widely used today, there are also teachings in the art in which normally gaseous solvents are used at both supercritical and subcritical conditions.

One such teaching is found in U.S. Pat. No. 1,802,533 to Reid, wherein a normally gaseous solvent, preferably butane or isobutane, is liquefied by decreasing the temperature and/or increasing the pressure, then passing the solvent through a bed of the oil-bearing material in an extraction vessel. The solvent and extracted oil are then passed to a still where the solvent is separated from the oil. The extracted material must then be placed in another still where it is heated to remove solvent which remained entrained in the extracted material. There is no suggestion of obtaining a substantially solvent-free, dry, extracted material without an additional treatment step after extraction.

Another extraction process is taught in U.S. Pat. No. 2,548,434 to Leaders wherein an oil-bearing material is introduced into the top of an extraction tower and passed counter-current to a liquefied normally gaseous solvent, such as propane, which is introduced at the bottom of the extraction tower. The tower is operated near critical conditions so that the solvent selectively rejects undesired color bodies, phosphatide, gums, etc. The resulting solvent/oil mixture can then be flashed to separate the solvent from the oil. In another embodiment, the solvent/oil mixture is first subjected to a liquid/liquid separation resulting in one fraction containing solvent and a less saturated fatty material, and another fraction containing solvent and a more saturated fatty material. The solvent is then flashed from both fractions. The extracted material remaining in the tower is drawn off and subjected to a vacuum flashing operation to remove entrained solvent.

U.S. Pat. No. 4,331,695 to Zosel teaches a process for extracting fats and oils from oil-bearing animal and vegetable materials. The material is contacted with a solvent, such as propane, in the liquid phase and at a temperature below the critical temperature of the solvent to extract fat or oil from the material. The resulting solvent/oil mixture is treated to precipitate the extracted fat or oil from the solvent by heating the solvent to above the critical temperature of the solvent without taking up heat of vaporization. The extracted residue (shreds) is then treated to remove any entrained solvent, either by blowing it directly with steam, or by indirect heating followed by direct steaming.

In U.S. Pat. No. 5,041,245 to Benado a continuous solvent extraction method utilizing propane is disclosed to remove oils from vegetable matter, particularly rice bran. According to this method a sufficient amount of liquid sealing medium is first injected into the vegetable matter in a feeding zone to form a dough-like plastic mass which is compacted and transported by a conveyor assembly to an extraction zone to form a bed. Propane is then introduced into the bed of the extraction zone being operated at 102°–122° F. and 125–250 psi to react with the bed material. The miscella of extracted oil and solvent resulting from this from the reaction of propane and bed material is then separated from the remaining solid residue of the bed material. The propane is then separated from the extracted oil by evaporation or volatization methods. The preferred separation method is to first subject the miscella to near its critical pressure (600 psi for propane/rice bran oil mixture) and significantly elevated temperatures (190°–200° F. for propane/rice bran oil mixture) which can also be near critical. This yields a high solvent light phase (98% solvent, 2% bran oil) and an oil-enriched heavy phase (60% solvent, 40% bran oil). The oil enriched heavy phase under reduced pressure is then delivered to a heater-evaporator and further treated to form a more oil-enriched heavy phase (10% solvent, 90% bran oil). This phase is then de-pressurized to about one atmosphere, and further treated in a second combined heater-evaporator stage to produce an oil stream having not more than 1–2% propane. Further similar treatment of this oil stream could be accomplished to remove additional propane if desired.

Other references which teach solvent extraction of oil-bearing materials, with normally gaseous solvents, include U.S. Pat. Nos. 2,682,551 to Miller; and 2,560,935 to Dickinson. In each of these processes, the extracted material must be further processed to remove entrained solvent.

While prior art extraction methods, particularly hexane extraction, have met with various degrees of commercial success, there still remains a need in the art for an improved solvent extraction method which is more energy and cost efficient, which can effectively remove the solvent from the extracted compounds to meet government regulations, which is especially suitable for the processing of certain troublesome oil-bearing materials, as well as which allows greater selectivity of the compounds removed from the carbonaceous material and which results in the recovery of de-oiled products having superior nutrient and health characteristics.

In solvent extraction of oil from carbonaceous materials, such as vegetable material, one problem has been fluidization problems in the bed formed by the material in the extraction vessel. This has lead to the need to pre-pelletize or compact the material before placing the material in the extraction vessel to increase the material bed permeability and allow the solvent to penetrate and flow through all portions of the material bed. This problem is particularly acute in those situations where a significant amount of the vegetable material are of small particle size, e.g., 100 to 400 mesh.

When the carbonaceous material contains significant amounts of oil, current solvent extraction methods have been inefficient for removing most or all of the oil. Examples of such material would include jojoba, cocoa, rape seed, and canola which are 30%–60% by weight oil. In these instances it has been necessary to first press the material to remove a majority of the oil before using solvent extraction methods to remove the remaining amounts of oil. Alternatively, the material could be first mechanically ground or pulverized to render the oil more accessible to reaction with the solvent. This latter method is difficult if the material has a high oil content.

In many of the instances where the material must first be pressed it is necessary to subject the material to high temperatures (200°–360° F.) to effectively remove the oil. In food material such high temperatures can result in deleterious effects to the desirable characteristics of the material, such as protein denaturing, vitamin destruction, and creation of carbonic acids which effect the aromatic odor of food material such as spices and herbs.

One particularly troublesome material is rice bran, one of the most plentiful and nutritious food sources known to man, but which is greatly under utilized. This is primarily because immediately following the milling step, a lipolytic enzyme in the bran is activated which catalyzes the hydrolysis of the glyceryl esters of the free fatty acids (FFA) present in the lipids. This is measured by FFA increase, which is rapid at typical atmospheric storage conditions. This starts fatty acid formation and bran rancidity in a matter of minutes after milling, and eventually renders it inedible to humans after several days of storage. Consequently, rice bran, as a source of oil and food, is under utilized, particularly in less developed countries. While the food industry struggles to find ways to obtain a rice bran, and rice bran oil, free of these undesirable characteristics, more and more beneficial uses and nutritive values are being discovered for these products. For example, it has recently been reported that rice bran fiber is effective for lowering cholesterol in humans. As a result, a tremendous demand has been created for a process which can stabilize the rice bran after milling, or a process which will allow for the extraction of oil while at the same time stabilizing the oil and bran against further fatty acid formation.

Other problems are encountered with different food products. For example, in eggs it is desirable to remove the cholesterol from the yoke, yet have the eggs retain their natural proteins not denatured, texture, and taste when cooked. This has not been possible with the present known methods of solvent extraction.

As another example, in many commercially available seasonings and food coating products one problem has been the inability to remove certain fats while retaining the flavoring of the products.

Still another problem has been to create seasoned or unseasoned food coatings that have dielectric characteristics which increase the ability of the coating to adhere to the food product during handling and cooking. A further problem with food coatings occurs when the food product is mircowaved. The moisture in the food product permeates the coating during the cooking process resulting in a soggy, unappetizing-looking crust.

Still other problems occur when trying to remove oils and fats from fried products such as potato chips and french fries. Current methods result in undesirable flavor or texture changes because of the inability of these methods to selectively remove only the undesired compounds.

The treatment of animal products by present solvent extraction processes to remove fats and cholesterol have not been commercially successful because of the dilatory effect on the taste, color or texture characteristics of the cooked animal products.

SUMMARY OF THE INVENTION

Therefore one object of this invention is to provide a solvent extraction process for selectively extracting substances from carbonaceous materials.

Another object of this invention is to provide a solvent process for the selective removal of various oils from food products that allows for cost effective removal of the solvent from the extracted oils and de-oiled products which meet current governmental regulations for low fat and fat free claims.

Still another object of this invention is to provide a solvent process for the selective removal of undesirable substances from food products which does not destroy the flavor, texture and/or color characteristics of the food product.

A further object of this invention is to provide a solvent process for the selective removal of undesirable substances from food coatings which also increases their dielectric characteristics.

A still further object of this invention is to provide a solvent process for the selective removal of undesirable substances from food coatings which also effects better sealing of moisture in the food product during cooking resulting in crisper, more appetizing products.

Another object of this invention is to provide novel oils and other substances having more desirable food consumption characteristics.

Another object of this invention is to provide a novel rice bran oil and de-oiled rice bran.

A further object of this invention is to provide a novel meat product.

A still further object of this invention is to provide a novel food coating product.

Other objects and advantages of this invention will become apparent from the ensuing descriptions of the invention.

Accordingly, a method for removal of selected substances from carbonaceous material by use of a solvent is provided comprising: (a) introducing the carbonaceous material containing the selected substances into an extraction zone to form a bed; (b) introducing a gas which at a given temperature liquifies at a higher pressure than the solvent, the introduction being made under a pressure and at a temperature to cause the temperature and pressure of the extraction zone to be sufficient to cause the solvent to liquify when the solvent is introduced to the extraction zone; (c) introducing into the extraction zone the solvent capable of extracting the selected substance; (d) passing the solvent through the bed of carbonaceous material to extract the substances from the material; (e) removing the resulting substance/solvent mixture from the extraction zone to a separation zone under conditions which will maintain the solvent in liquid form as it is passed through the bed of carbonaceous material and out of the extraction zone to the separation zone; and (f) separating the solvent from the substances in the separation zone.

In a preferred embodiment of the present invention, the substance/solvent mixture is removed by introducing a second compound, such as nitrogen, methane, or $CO_2$, having dissimilar and greater vaporization conditions from the solvent which is used to not only purge the extracted compound/solvent mixture from the extraction zone, but to maintain the temperature and pressure so that the first introduced solvent is maintained in liquid form during the purging and movement to the separation zone.

In another preferred embodiment of the present invention, the material in the extraction zone is stressed by increasing for short periods of time pressure differential between the top and bottom of the extraction zone bed.

BRIEF DESCRIPTION OF THE FIGURES

FIG. 7 is a tabular representation of the characteristics of a rice bran de-oiled in accordance with the process of this invention.

DESCRIPTION OF THE PREFERRED EMBODIMENTS OF THE INVENTION

Figure 1:
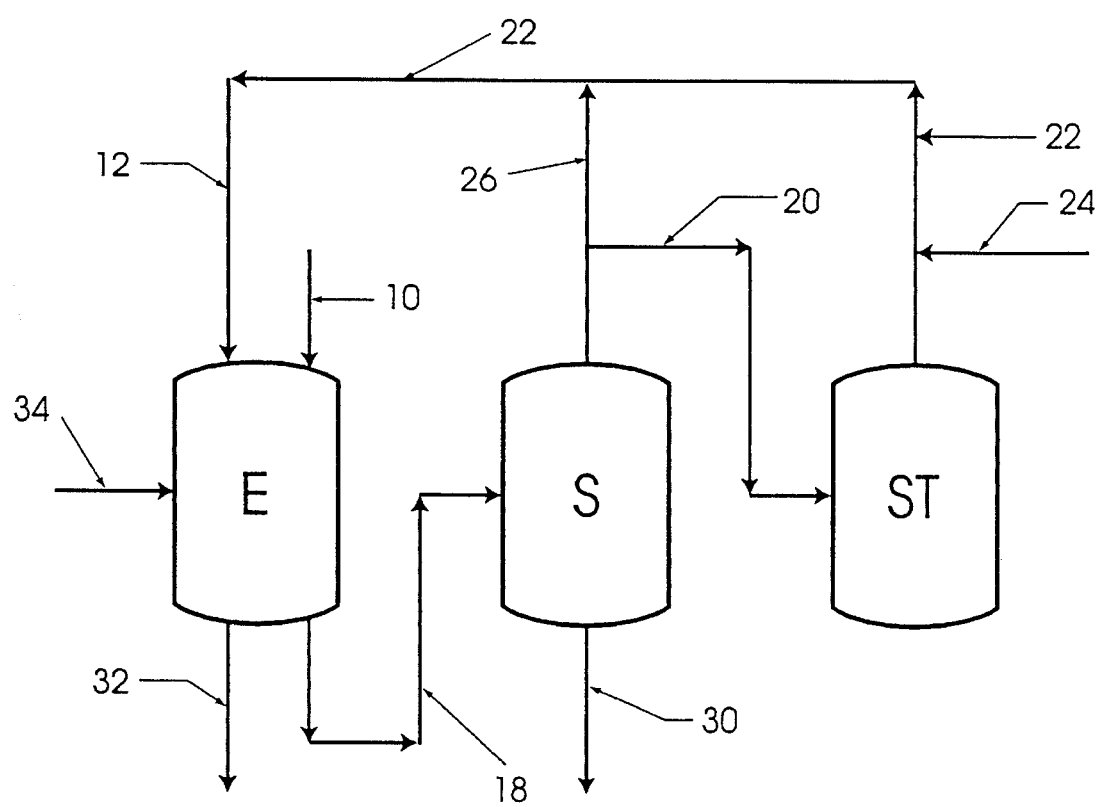
FIG. 1 is a simplified schematic drawing of a preferred solvent extraction process of the present invention.

Any carbonaceous material can be treated to selectively remove substances by the solvent extraction method of the present invention. Non-limiting examples of such carbonaceous include soybeans, cottonseed, linseed, and cereals such as rice bran, wheat bran, and corn meal, as well as small particle products such as food coatings, meats. Non-limiting examples of the types of substances which can be removed from such materials include phospholipids, fats, fatty acids, alcohols, waxes, gums, stearols, oil soluble proteins, flavonol, mineral oils, essential oils, oils from cooked or processed food, and PCB's.

Solvents suitable for use in the present invention are any solvent which is normally a liquid at extraction conditions, and in which the substance to be extracted is soluble under the reaction conditions. The selection of the appropriate solvent (or combinations of solvents) can thus be made based on its (their) known solubility characteristics. If there is to be selective removal of substances, then the solubility of those substances must be considered in the selection of the solvent (or combination of solvents), as well as the operating conditions used in the process. In certain circumstances, such as when treating food products, other known characteristics of the solvent may need to be taken into account.

Without limiting the scope of this invention, the preferred embodiments are described as applied to the treatment of certain food products to remove oils, waxes, gums, fats, and/or cholesterol.

Depending on the particular type substances being removed solvents suitable for use in the present invention would include any solvent which is normally a liquid at extraction conditions, such as hexane, or which can be converted to a liquid at extraction conditions. Preferred solvents are those which are normally gaseous at typical atmospheric conditions. That is, those which are a gas at about room temperature (about 70° F.) and atmospheric pressure. Non-limiting examples of preferred solvents include methane, ethane, propane, butane, ethylene, propylene, butylene, sulfur dioxide, carbon dioxide, $CHF_3$, $CClF_3$, $CFBr_3$, $CF_2=CH_2$, $CF_3-CF_2-CF_3$, $CF_4$, $CF_4$, $CH_3-CF_3$, $CHCl_2$, ammonia, nitrogen, dichlorodifluor methane, dimethylether, dimethylsufaoxide (DMSO), acetone, nitrious oxide, methyl fluoride, and halogenated hydrocarbons or combinations thereof which are normally gaseous as indicated, as well as various alcohols. For removal of oil from rice bran and similar grains preferred solvents are propane, butane, and mixtures thereof; and, more preferred is propane.

The weight ratio of solvent to oil-bearing material will be from about 1:1 to 2:1, preferably from about 1.2:1 to 1.5:1. A cosolvent, such as a $C_2$ to $C_6$ alcohol, preferably ethanol, may be used. If a co-solvent is used it may be used in place of at least about 0.5 to 90 vol. %, preferably about 5 to 50 vol. %, and more preferably from about 5 to 25 vol. %, of the primary solvent.

Referring now to the Figures, oil-bearing material is introduced into extraction zone E via line 10. The extraction zone can be comprised of one or more vessels suitable for the volumes, temperatures, and pressures employed. For illustration purposes, only one vessel is shown, but in actual practice it would be preferred to use two or more vessels. In this way, while a vessel has undergone extraction and is being unloaded, another vessel can be loaded with the oil-bearing material to continue the extraction process. This would represent a continuous type of operation. Unlimiting types of vessels which may be used in the extraction zone include fixed-bed, slurry-bed, moving-bed, as well as reactors in which the oil-bearing material is fed therethrough on or in a bucket, a belt with perforations, or with a screw. It is preferred that the vessel be one in which a limited fixed-bed of oil-bearing material can be loaded with a sealing piston. It is preferred to evacuate the vessels of the extraction zone prior to the introduction of solvent, especially if the solvent is propane which may form an explosive mixture with air. The evacuation can be conducted in any suitable manner, such as, by use of a vacuum pump or by merely venting the air as it is displaced by the solvent during solvent loading or circulating $N_2$ or $CO_2$ through the bottom and out the top. Because certain solvents, such as propane, can become explosive when mixed with air special conditions or steps may be needed if such a solvent is selected. Such conditions or steps are well known in the art. Of course any propane which contaminates the vented air can be separated by pressure or membranes, etc. or burned-off as a heat source during venting.

It is also within the scope of the present invention that the extraction zone be flushed with inert gas prior to introduction of the solvent. That is, by displacing the air in the extraction zone with the inert gas. It is preferred that the inert gas be at elevated temperatures, for example at a temperature from about 80° to 400° F., but which does not heat the material beyond 140° F., preferably from about 55° to 120° F., during the heat transfer. This hot inert gas flush will act as evacuating the extraction zone of air as well as heating, or drying, the oil-bearing material.

It is preferred that the oil-bearing material be dry before being contacted with the solvent to mitigate any freezing which may occur during the process. While the hot inert gas can be used to dry the oil-bearing material, it may also be dried by any other appropriate means, such as by heating it by conventional means, including the use of microwaves. Furthermore, after flushing the extraction zone with inert gas, the inert gas can be used to pressurize the extraction zone so that when the normally gaseous solvent is introduced into the extraction zone it is immediately transformed to the liquid state to prevent refrigeration freezing.

Returning to the Figures, the normally gaseous solvent is fed into the extraction zone via line 12 in the vapor state, under an effective pressure and temperature which will cause the normally gaseous solvent to liquefy. It is also within the scope of this invention that the normally gaseous solvent be introduced into the extraction zone already in a liquid state. The inert gas can also be used to pressurize the extraction zone so that as the normally gaseous solvent enters the extraction zone, it is converted to its liquid form. Typically, the extraction temperature will be from about ambient temperature, up to, but not including, the temperature at which degradation, or denaturing, of the proteins of the oil-bearing material is initiated. It is also desirable to protect the vitamins against degradation. This temperature will typically range from about ambient temperature to about 140° F, preferably from about 60° F. to 130° F., more preferably from about 70° F. to 120° F., most preferably from about 70° F about 110° F. For heat sensitive material such as dried egg yolks it is preferred that the temperature be 60°–90° F. It is within the scope of this invention to operate the extraction zone at a temperature and/or pressure which will selectively remove the oils, but leave any substances such as gums and waxes in the extracted oil-bearing material, or to selectively extract the phospholipid gums and waxes with the heavier oil fractions. Such a temperature will typically be less than about 80° F. at about atmospheric pressure. Of course, the temperature may vary somewhat at different pressures. In addition, these temperatures may vary for any given oil-bearing material and solvent combination, and the precise conditions are within the skill of those in the art given the teaching herein. After the oil has been removed, it is then possible to similarly treat the remaining material, but at slightly elevated temperatures and/or pressures conditions to remove the waxes and gums. The above stated conditions are the preferred conditions when the oil-bearing material is rice bran and the solvent is propane. Since the de-oiled rice bran is a commercially important product it is preferred that the temperature not be so high that the proteins and vitamins of the rice bran are destroyed during the extraction process. The pressure maintained in the extraction zone will be a pressure which is effective for maintaining the solvent as a liquid, and to drive the oil/solvent mixture rapidly through the vessel. While this pressure will be dependent on such things as the particular solvent and temperature employed, for propane it will typically range from less than atmospheric pressures to about 250 psig, preferably from about −15" Hg to 200 psig, more preferably from about 100 psig to 140 psig.

The extraction zone can also be subjected to conditions which will repeatedly stress and relax the oil-bearing material and/or solvent molecules. This is believed to create a washing effect that enhances the ability of the solvent to extract the oil from the material. In addition it is believed that such pressure pulsing aids in the separation of the heavier oil from the lighter solvent after the oil has been extracted from the material and while it is flowing toward the bottom of the reactor. Such stressing and relaxation are effected to create pressure differentials between the top and bottom of the extraction zone of at least 0.25 psig. The pressure differential can be as great as will permit, under the temperature and pressure conditions of the material bed, the solvent passing through the exit port of the reactor to remain as a liquid.

This pressure differential can also be created by actuating and deactuating a piston or diaphragm in the pressure or solvent line. The stressing and relaxation conditions can also be caused by sonification; i.e., by subjecting the ingredients of the extraction zone to sonic energy.

In a particularly preferred method a second solvent or inert gas is introduced to the top surface of the extraction zone to increase the pressure and then briefly open a valve in the separation zone to cause the second solvent or inert gas to displace part of the propane/oil mixture through the bottom filter. In this manner it acts as a fluid piston. This action allows the bed to be comprised of much smaller particles than has generally heretofore be used in solvent extraction processes. There is no need to pre-pelletize such particles before treatment.

This also allows the utilization of the forces of polarity in combination to extract different materials at the same time by using pressure from the second gas. By selecting a second solvent having a different polarity that solvent can be used to remove different substances, such as cholesterol from egg powders.

The period of time that the valve remains open would be sufficient to permit at least some of the extracted oil and propane to flow through the bottom filter in the reaction vessel and into the separation zone. The extracted oil and propane can at that time be separated if desired. After the valve is closed additional liquid propane or $N_2$ is then added to the bottom of the extraction zone to again raise the pressure and clear the filter in the extraction zone and purge the second solvent or inert gas. If another compound was extracted by the second solvent, then the mixture of the second solvent and this other compound will be forced through the top filter of the extraction zone and into an upper separation zone where the other compound can be recovered by known separation techniques.

In an alternate embodiment the bottom valve can be continuous open, and the top valve of the reactor through which the second gas enters the extraction bed can periodically be opened. This is achieved by setting the pressure at the top valve sufficient higher than the desired pressure in the extraction bed, and by opening the top valve before the pressure at the bottom valve reaches a pressure too low to maintain the extraction bed pressure at the desired level.

The pulsing procedure may be repeated as many times as desired and with the proper construction of the reaction vessel utilizing many different solvents. The number of pulsings, as well as the amount of the pressure differential, and the time between pulses, depends on the accessibility of the oil in the oil bearing material for contact by the solvent, as well as the polarity strengths of the substances involved; i.e., how strongly bonded the oil is to other substances, such as the proteins, in the product.

The extraction can also be accomplished in more than one extractions; i.e., the oil-bearing material can undergo several extractions with fresh solvent in order to assure more complete removal of oil. For example, a first extraction may leave as much as about 1 to 3 vol. % of the oil in the material which weight percent is based on the total weight of the extracted material. A substantial amount of this residual oil can then be removed by subjecting the oil-bearing material to at least one other extraction with fresh solvent. It is preferred that less than about 1 wt. %, more preferably less than about 0.1 wt. % of the extracted material represent that residual oil fraction in the de-oiled material. Of course, the economics of the process must be considered so that the cost of additional extractions does not exceed the value of the added products from the additional extractions.

The oil-bearing material preferably sits on a filtering means, such as a screen, or membrane filter, or perforated tray (not shown), wherein the solvent passes there-through with the extracted oil. It is understood that an alternative process feature is one wherein the filtering means is situated between the extraction zone and the separation zone. The solvent is maintained in contact with the oil-bearing material for an effective period of time. That is, for a period of time which will result in the extraction of a predetermined amount of oil. Of course, if too much oil still remains in the oil-bearing material after extraction, it may be subjected to one or more additional extraction cycles or the extraction time extended with pressure pulsing according to the condition of the oil-bearing material feedstock or the desired product to be recovered.

The solvent/oil mixture is passed from the extraction zone via line 18 to separation zone S under conditions which will maintain the solvent as a liquid. It is important that the pressure be maintained in the extraction zone during removal of the solvent and oil not only to prevent unnecessary evaporation of solvent during removal which may result in freezing of the extracted material, but also to not complicate the removal of excess solvent in the material to less than that permitted by government regulations. A preferred method of maintaining the pressure in the extraction zone during removal of solvent and oil is to introduce a gas which has dissimilar vaporization condition characteristics from the solvent, more particularly vaporization condition characteristics greater than the solvent so that it can be used to add pressure and heat to the extraction zone during the removal of the oil/solvent mixture to prevent freezing of the oil bearing material, the remaining oil/solvent mixture, and the extracted mixture.

Such gases would include an inert gas, such as nitrogen, into the extraction zone to replace the leaving solvent/oil mixture. By "inert gas" is meant a gas which will not cause a deleterious reaction of the extracted oil or extracted material. The preferred inert gas is nitrogen, carbon dioxide or methane. More preferred is nitrogen. The gas replaces the solvent/oil mixture in the extraction zone and maintains substantially the same pressure throughout the solvent/oil removal step. This prevents freezing of the extracted material. It is preferred that the inert gas which is introduced into the extraction zone to displace the solvent/oil mixture be heated. That is, that it be at a temperature from about 60° F. to 140° F., preferably at a temperature from about 100° F. to 120° F. This heated inert gas can enhance the recovery of any residual oil and solvent left in the extracted material.

It is also preferred that in designing the reactor vessel and in selecting the solvents to be used, the specific gravities of the substances to be removed and the specific gravity of the solvents be as different as possible. This has found to be beneficial in the separation of the oil and solvent from each other, as well as the oil bearing material, during the pulsing stages. For example the large differential in the weight of propane and oil causes the propane to separate from the oil and move upward in a purified form to contact more oil still bound in the rice bran while the extracted oil rapidly moves toward the separation zone for removal. This reduces the amount of solvent needed to remove the oil and/or reduces the amount of separation of solvent from the extracted oil.

It is also within the scope of this invention that solvent vapor be passed through the de-oiled material either in place of the inert gas or following the passage of inert gas. This solvent vapor will act to remove at least a portion of the residual oil/solvent mixture left in the de-oiled material.

The separation zone is run under conditions which will enhance the separation of solvent from the oil. It is preferred that some heat be applied preferably from a slightly heated solvent or inert gas, to enhance this separation. Other methods which can be employed for operating the separation zone to enhance solvent/oil separation include distillation, centrifugation, the use of membranes and reduced pressures, and/or cryogenics. The separated solvent is then passed, via line 20, to storage zone ST where it can be recycled via line 22 to the extraction zone. Makeup solvent, if needed, can be added via line 24. At least a portion of the recovered solvent may also be recycled directly to the extraction zone via line 26.

It is also within the scope of the present invention that the separation be conducted in more than one vessel. For example, the solvent/oil mixture (which may also include some of the second dissimilar gas) may first be subjected to a first separator vessel wherein a liquid/liquid (and gas if the second dissimilar gas is present) separation occurs. That is, the separation vessel is under enough pressure so that the solvent will not vaporize. The liquid solvent is separated from the oil phase. The liquid solvent fraction is then introduced into a second separation vessel wherein a liquid/vapor separation occurs. That is, the solvent is vaporized and collected in a storage vessel and any residual oil fraction is separately collected. This second vessel will typically be smaller than the first and may include the use of a vacuum or other conventional means to aid in the vaporization of the solvent.

If gums and waxes, or certain oils, are present in the extracted oil fraction, they may be solidified out of the oil by cooling. The cooling can be provided by use of the vaporized solvent which will still be cool owing to the vaporization step.

The substantially solvent-free oil is collected via line 30. The de-oiled oil-bearing material can be collected from the extraction zone by any appropriate means. For purposes of simplification, the de-oiled material is shown in the Figure as being collected via line 32.

In those situations where the oil-bearing material is one which is unstable because of the production of fatty acids, such as rice bran, a stabilizing agent can be added to the extraction zone via line 34. Any appropriate means can be used to add the stabilizing agent. That is, it can be sprayed directly onto the oil-bearing material prior to the material being introduced into the extraction zone. It can also be introduced into the extraction zone either directly, (as shown in the figure) or in combination with the solvent. Rice bran, the preferred oil-bearing material, upon milling, activates lipolytic enzymes which catalyze the production of free fatty acids. These free fatty acids cause the bran to become rancid. Non-limiting examples of stabilizers which can be used to stabilize rice bran include an inert gas such as nitrogen, food grade acids and alcohols, preferably ethanol, mercaptans, and enzyme inhibitors, protein, and/or peptides. Preferred are food grade acids and alcohols, non-limiting examples of which include citric acid, ascorbic acid, lactic acid, gluconic acid, malic acid, ethanol and the like. More preferred are citric acid and ascorbic acid, with ascorbic acid being most preferred.

The rice bran which results from the preferred embodiment of the present invention is unique in the industry in commercial quantities. That is, not only are the fatty acids stabilized, but deleterious ingredients which contribute to poor taste are also absent. Furthermore, the rice bran of the present invention also contains more vitamin B's and even protects the cyanocobalamin (vitamin B-12) than an identical bran which has been extracted by use of a conventional hexane extraction process. Consequently, the rice bran produced in accordance with the present invention fills a long felt need in the art.

Figure 2:
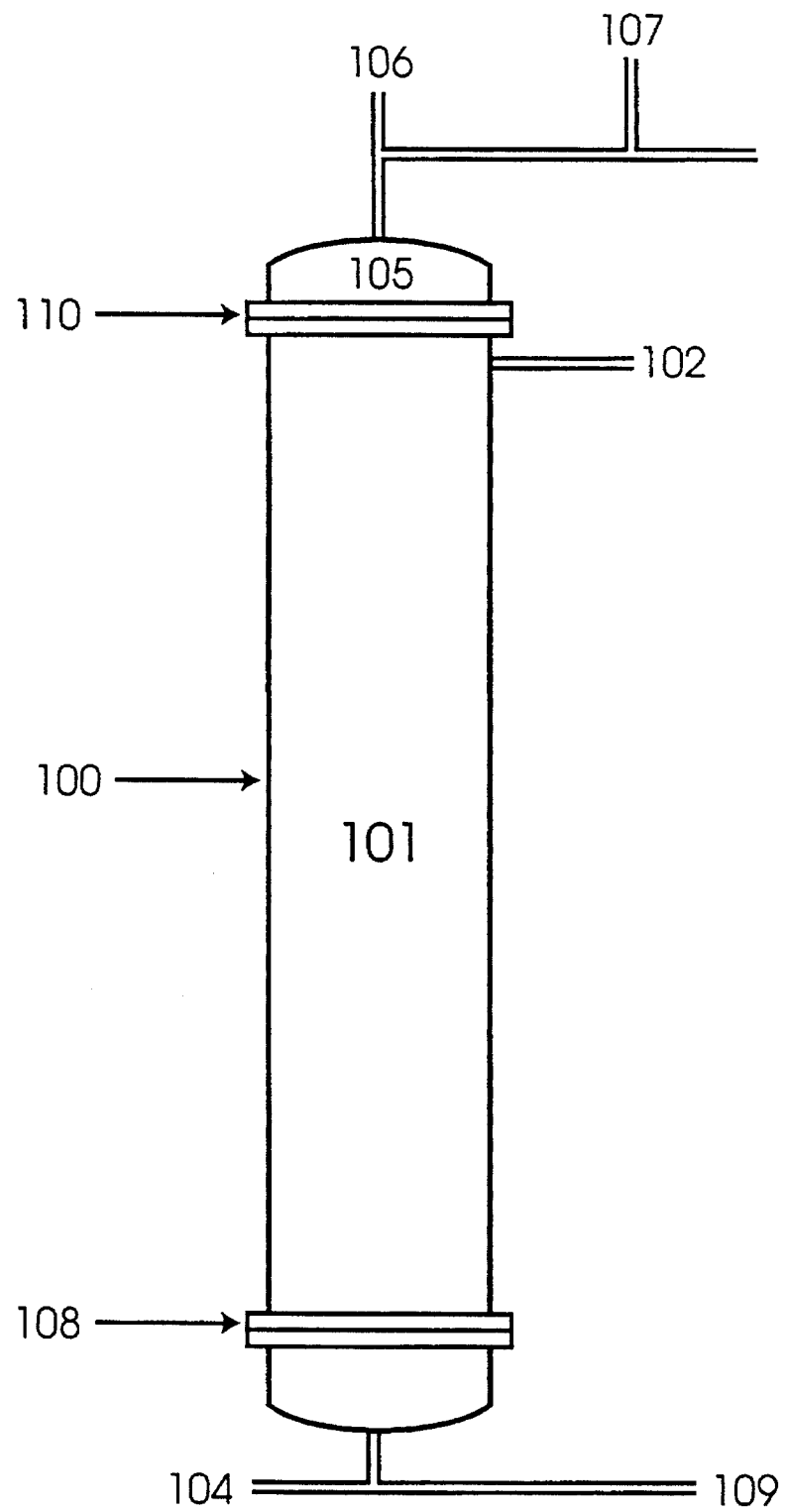
FIG. 2 is a schematic representation of the reaction vessel utilized in experiments described below.

Utilizing the reactor vessel 100 schematically illustrated in FIG. 2 the experiments results of which are described in FIGS. 3–7 were conducted as follows. The rice bran or other material was introduced to the extraction zone 101 of the reactor 100 via line 102. Valve 103 operatively attached to line 102 was closed. Nitrogen was then introduced into the bottom of extraction zone 101 via line 104 in sufficient quantity to purge the air from extraction zone 101 into upper separation zone 105. The air was then purged from upper separation zone 105 through line 106 into the atmosphere. The pressure in extraction zone 101 was then adjusted and maintained at 90 psi. Propane was then introduced through line 104 into extraction zone 101 in quantities sufficient to purge the nitrogen from the reactor 100 through line 106 and to increase the pressure within extraction zone 101 to 127 psi.

Nitrogen was then reintroduced through line 107 in quantities sufficient to create a pressure differential between the top and bottom of extraction zone 101 of 1–50 psi. Valve 106 was then cracked open until the pressure differential was dissipated at which time valve 106 was closed. This procedure was repeated for about ten minutes by re-introducing nitrogen through line 107.

Nitrogen was then used to purge extracted oil/propane mixture from the extraction zone 101 and from reactor 100 through line 109. At all times during the procedure to this phase, the pressure and temperature was maintained at levels to prevent the propane from vaporizing while the oil/propane mixture was forced through the 400 mesh bottom filter 108.

Vacuum to 15" Hg is completed and nitrogen at 80° F. was then circulated through the extraction zone 101 to remove all trace amounts of propane which remained in the de-oiled rice bran which was removed from reactor 100 through line 106.

Upper 200 mesh filter 110 is removed and the de-oiled rice bran was removed from reactor 100. The extracted $N_2$/oil/propane mixture removed from reactor 100 were separated by alternately cooling and heating, and use of pressure in a separate vessel not shown by well known means.

The de-oiled rice bran or other material was then analyzed. The results are summarized below and depicted in FIGS. 3 through 7.

FIG. 3

Figure 3:
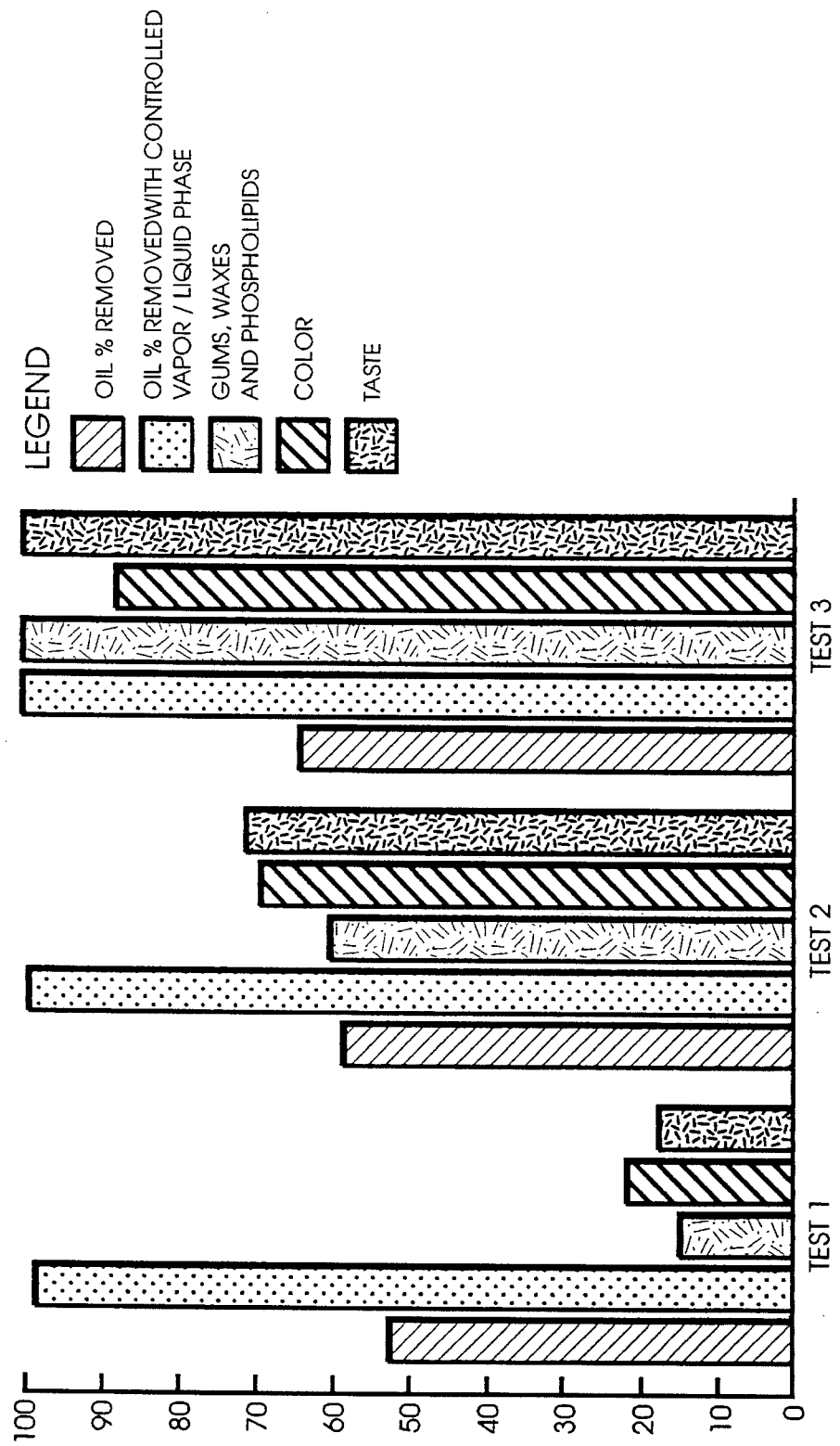
FIG. 3 is a graphical representation of the results of tests run utilizing the process of this invention in extracting oils from rice bran.

With regard to the results shown in FIG. 3, the product tested was stabilized and unstabilized full fat rice bran (not pelletized). The oil variance ranged from 12% to 18.3% by weight, depending on the hull and rice polish contaminants, with an average of 17.5% by weight. The results varied as pressures were increased from 120 psi to 250 psi. It should be noted that similar results were found for dry egg yolk, defatted cocoa powder, jojoba bean and soya, although these results were not directly proportional. For each of the three tests whose results are shown in FIG. 3, the first bar represents oil percentage removed when the vapor liquid pressure was not controlled. Due to freezing, limited heat was applied, and the time was extended four hours for test completion.

The second bar represents oil percentage removed when the isothermal vapor liquid pressure was controlled using pulsed nitrogen gas to increase and decrease the pressure, thus creating a washing action. This testing was completed within 45 minutes.

The third bar represents oil percentage removed when the gums, waxes and phospholipids were removed from the product. The fourth bar represents a lighter color change as compared to the original product, and the fifth bar represents the removal of hexanol to eliminate the bad taste.

FIG. 4

Figure 4:
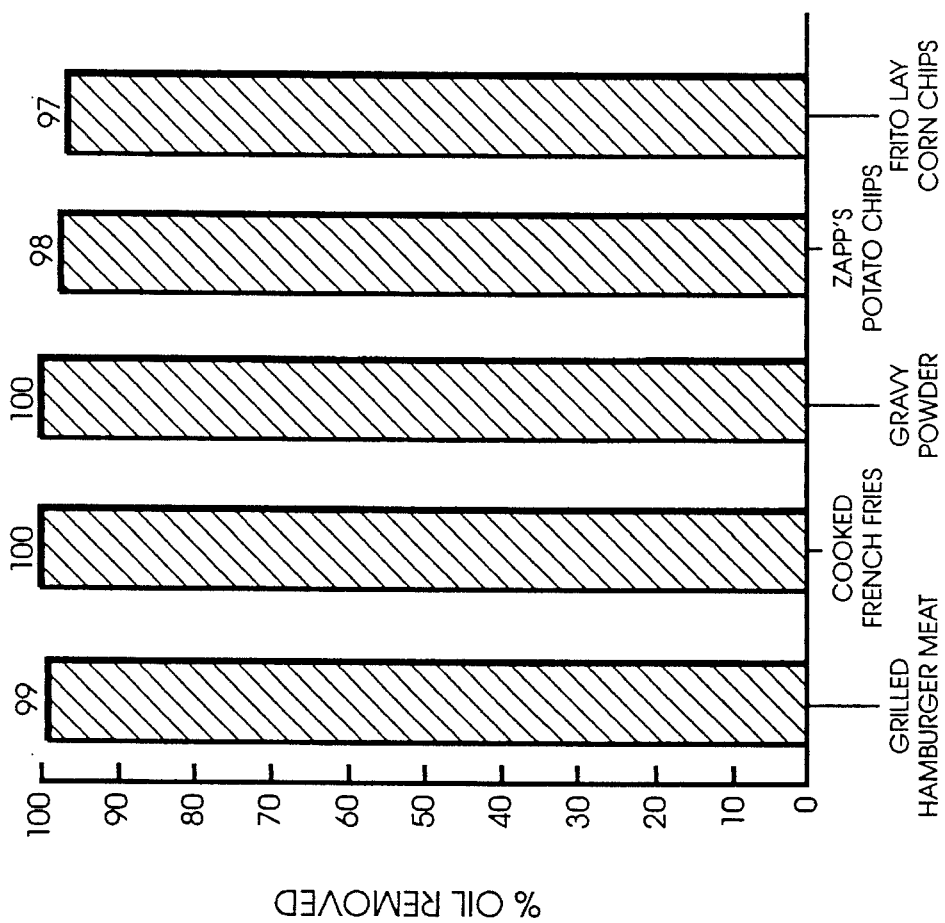
FIG. 4 is a graphical representation of the results of tests run utilizing the process of this invention in extracting oils from certain commercially available cooked food products primarily fried food products.

FIG. 4 shows results for the percentage of oil removed for a variety of commercially available cooked food products. The bars represent the following products, from left to right in the graph: (1) grilled hamburger meat, (2) cooked french fries, (3) wheat flour gravy mix having 51% hydrogenated soya oil, (4) potato chips, and (5) corn chips. Both the hamburger meat and french fries were obtained from a local McDonald's® restaurant. When the soya oil was separated from the gravy mix, the oil and flour carried an excellent taste from the original product. As can be seen by the results, this process removed enough oil to allow "low fat" or "no fat" labeling of all these products.

FIG. 5

Figure 5:
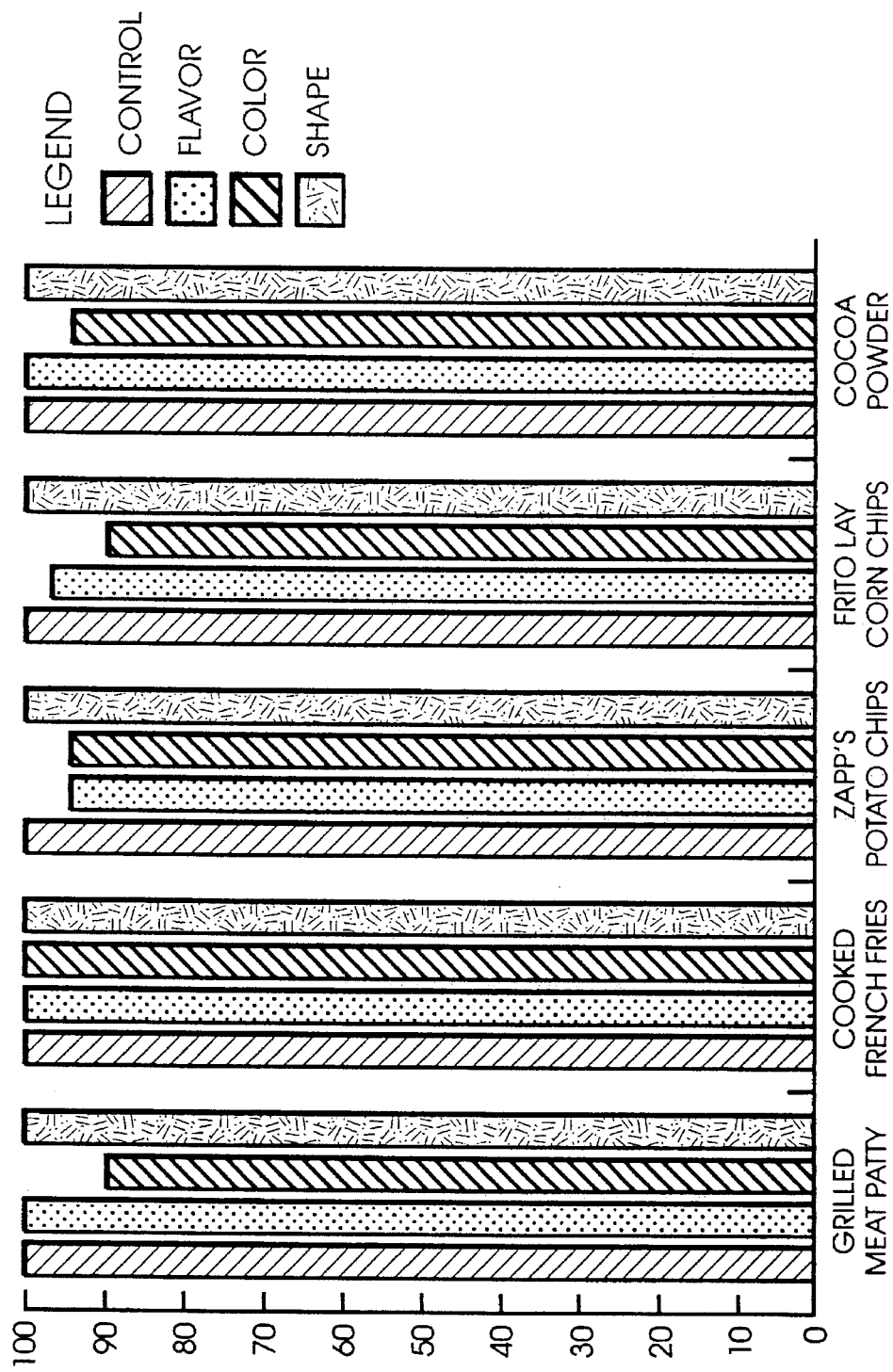
FIG. 5 is a graphical representation of the results of tests run utilizing the process of this invention indicating the effect on the flavor, color and shape of certain commercially available cooked food products.

FIG. 5 shows results for the flavor, color, and shape (after oil extraction) for a variety of commercially available cooked food products compared to a control group of hexane and $CO_2$ extracted cocoa powder (10%–12% butter fat). The bars represent the following products, from left to right in the graph: (1) grilled hamburger meat, (2) cooked french fries, (3) potato chips, (4) corn chips, and (5) cocoa powder. The test panels for flavor, color, and shape consisted of four different groups, where each group comprised three individuals.

Both the hamburger meat and french fries were obtained from a local McDonald's® restaurant. The cocoa powder consisted of 10%–12% cocoa butter which was extracted to less than 0.05% cocoa butter, and was compared for flavor, color and shape to hexane and $CO_2$ extracted cocoa powder having less than 0.5% cocoa butter.

FIG. 6

Figure 6:
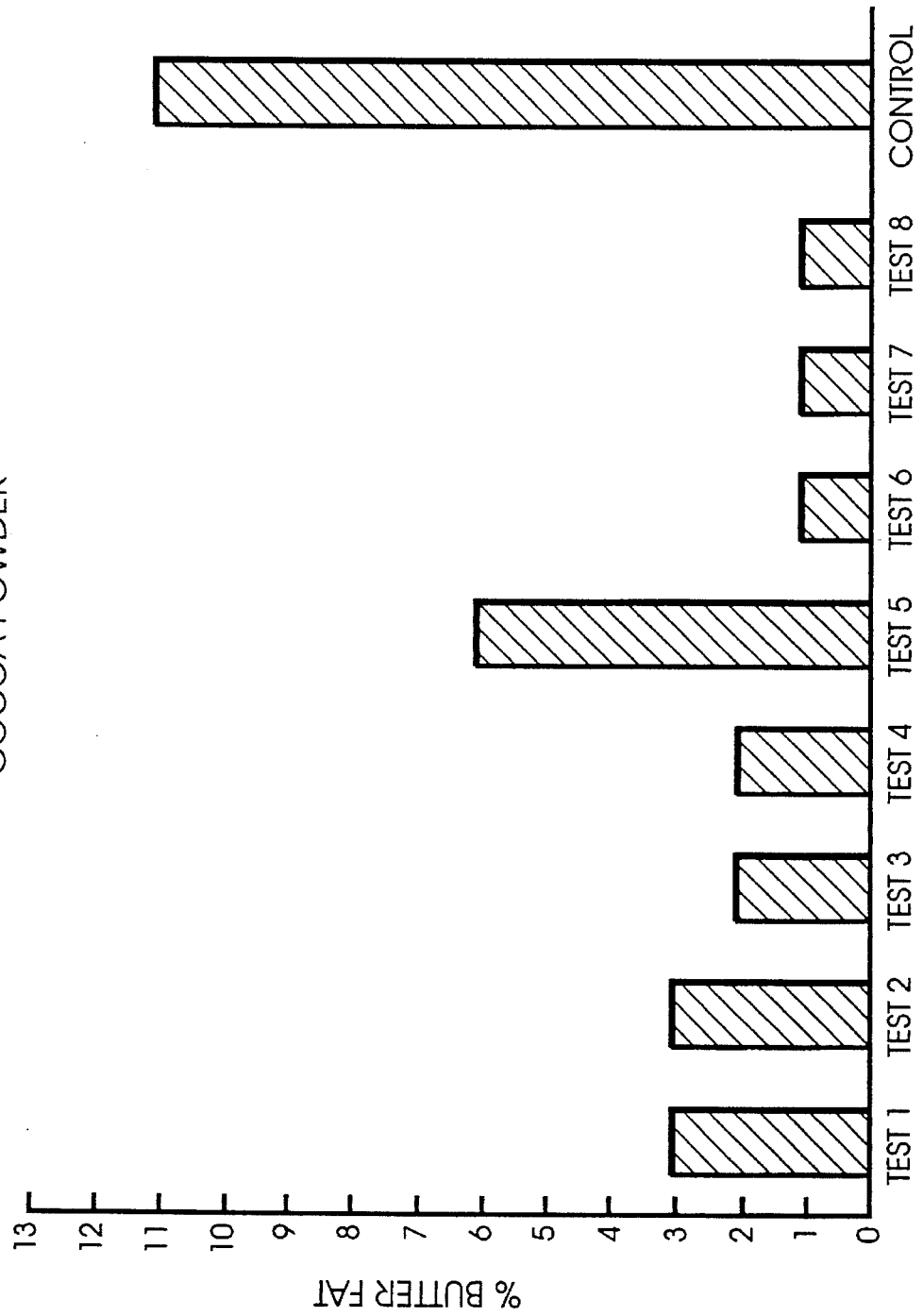
FIG. 6 is a graphical representation of the results of tests run utilizing the process of this invention in extracting butter fat from certain name brand cocoa powders.

FIG. 6 shows extraction results over eight (8) tests for a number of name brand cocoa powders as compared to a control level of 11% butter fat. The products were selected from Gerken's cocoa, Dutch cocoa from Holland, and Savannah cocoa from Georgia. For each of these tests, the flavor, taste and color of the processed cocoa were far superior to hexane extracted cocoa butter. Ten test panels using blind taste tests confirmed that the flavor of the cocoa processed according to the invention exceeded the original control powder by over 50% of the test panelists.

It should be noted that in Test No. 5, lumps were created in the reactor when nitrogen pulsing and pressure phase change control was eliminated. This lack of nitrogen pulsing allowed the solvent to bypass some of the material which changed phase and froze into oil-rich lumps of cocoa powder.

What is claimed is:

1. A process for extracting oil from an oil-bearing cooked food product, which process comprises treating the cooked food product with a normally gaseous solvent selected from the group consisting of butane, propane, and mixtures thereof, and separating oil-laden solvent from said cooked food product of reduced oil content.

2. The process of claim 1 wherein the extraction zone is maintained at a temperature from about 60° F. to about 130° F.

3. The process of claim 2 wherein the extraction zone is maintained at a temperature from about 70° F. to about 110° F. and at pressures ranging from pressures less than atmospheric pressure to about 200 psig.

4. The process of claim 3 wherein the solvent molecules are stressed by fluctuating the pressure during extraction by at least 0.25 psig.

5. The process of claim 1 wherein the oil-bearing cooked food product is a fried food based on a food selected from the group consisting of potatoes and corn.

6. The process of claim 3 wherein the fried food is selected from potato chips and corn chips.

7. The process of claim 1 wherein the oil-bearing cooked food product is a meat based food product.

8. The process of claim 7 wherein the oil-bearing meat based food product is chopped beef.

9. A process for extracting oil from a food which has been cooked in oil, thereby resulting in an oil-bearing food product, which process comprises:

(a) placing said oil-bearing cooked food product into an extraction zone;

(b) removing air from said extraction zone;

(c) introducing a normally gaseous solvent selected from butane, propane, and mixtures thereof, into the extraction zone so as to contact said oil-bearing cooked food product;

(d) providing a pressure and a temperature in said extraction zone which is effective for maintaining the solvent in a liquid phase;

(e) maintaining the solvent in contact with the oil-bearing cooked food product for an effective amount of time to remove a predetermined amount of oil;

(f) introducing an inert gas into said extraction zone in a manner to displace said solvent and extracted oil from said extraction zone while maintaining temperatures and pressures in said extraction zone which are effective for maintaining said solvent in a liquid phase;

(g) passing said displaced extracted oil and solvent to a separation zone under conditions which will maintain the solvent in the liquid phase;

(h) separating said solvent from said extracted oil in said separation zone;

(i) collecting said extracted oil; and (j) collecting the cooked food product containing substantially less oil.

10. The process of claim 9 wherein the solvent is passed from the extraction zone to the separation zone by introducing an inert gas into said extraction zone thereby displacing the solvent at substantially the same temperature and pressure as the solvent passes through the oil-bearing material and out of the extraction zone.

11. The process of claim 10 wherein the extraction zone is maintained at a temperature from about 70° F. to about 110° F. and at pressures ranging from pressures less than atmospheric pressure to about 200 psig.

12. The process of claim 11 wherein the oil-bearing food product sits on a filtering screen which allows the passage of solvent and oil, but not the material itself.

13. The process of claim 12 wherein the solvent molecules, during extraction, are stressed by fluctuating the pressure by at least about 0.25 psig.

14. The process of claim 13 wherein the molecules of solvent are stressed by use of sonication.

15. The process of claim 9 wherein the cooked food product is a fried food based on a food selected from the group consisting of potatoes and corn.

16. The process of claim 15 wherein the fried food product is selected from potato chips and corn chips.

17. The process of claim 9 wherein the oil-bearing cooked food product is a meat based food product.

18. The process of claim 17 wherein the oil-bearing meat based food product is chopped beef.

19. The process of claim 13 wherein the cooked food product is a fried food product selected from those based on a food selected from the group consisting of meat, potatoes, and corn.

20. The process of claim 19 wherein the cooked food product is selected from potato chips and corn chips.

* * * * *